United States Patent [19]

Boorman et al.

[11] 4,438,218

[45] Mar. 20, 1984

[54] CATALYST FOR SULPHUR REMOVAL FROM HYDROCARBONS

[75] Inventors: Philip M. Boorman; Tristram Chivers; Donald F. Tavares; Kalabeerappa N. Mahadev, all of Calgary, Canada

[73] Assignee: Alberta Oil Sands Technology and Research Authority, Edmonton, Canada

[21] Appl. No.: 286,843

[22] Filed: Jul. 27, 1981

[51] Int. Cl.$^3$ .......................... B01J 23/04; B01J 27/04
[52] U.S. Cl. .................................... 502/220; 502/221; 502/344; 208/215; 208/230
[58] Field of Search ................ 252/439; 208/215, 230; 502/220, 221, 344

[56] References Cited

U.S. PATENT DOCUMENTS

| | | | |
|---|---|---|---|
| 2,402,684 | 6/1946 | Signaigo | 252/439 |
| 2,402,694 | 6/1946 | Tanner | 252/439 |
| 2,406,200 | 8/1946 | Cole | 252/439 |
| 2,471,108 | 5/1949 | Hill | 208/230 |
| 2,490,488 | 12/1949 | Stewart | 252/439 |
| 2,558,508 | 6/1951 | Appleby et al. | 252/439 |
| 3,185,641 | 5/1965 | Cowden | 208/230 |
| 3,354,081 | 11/1967 | Aldridge | 208/230 |
| 4,007,109 | 2/1977 | Baird, Jr. et al. | 252/439 |
| 4,197,191 | 4/1980 | Gatsis | 252/439 |

FOREIGN PATENT DOCUMENTS 907770 10/1962 United Kingdom ............... 208/215

Primary Examiner—Delbert E. Gantz
Assistant Examiner—O. Chaudhuri
Attorney, Agent, or Firm—Ernest Peter Johnson

[57] ABSTRACT

A novel catalyst is provided which is effective in removing at least a portion of the sulphur contained in hydrocarbons, without the use of an external hydrogen source. The catalyst is a sulphided mixture, on a catalyst support, of (a) a sulphide of one or more of the transition metals iron, vanadium, molybdenum and copper, (b) a sulphide of either sodium or potassium, and (c) a hydroxide of either sodium or potassium. Sulphur removal with the catalyst is demonstrated with oil sand bitumen, heavy crude oil and asphaltenes.

8 Claims, 6 Drawing Figures

CATALYST FOR SULPHUR REMOVAL FROM HYDROCARBONS

BACKGROUND OF THE INVENTION

The present invention relates to the removal of sulphur from sulphur-containing hydrocarbon feedstocks. The invention provides a novel metal sulphide catalyst, a process for preparing the catalyst, and a process for using the catalyst to remove at least a portion of the sulphur contained in such feedstocks.

Present day commercial hydrocarbon upgrading installations utilize hydrotreating to remove sulphur from the hydrocarbon feedstock. The feedstock is passed over a conventional hydrodesulphurization catalyst in the presence of hydrogen to remove sulphur in the form of hydrogen sulphide. Often the hydrodesulphurization catalyst comprises one or more transition metal sulphides, for example a sulphide mixture of cobalt molybdate.

While these hydrodesulphurization catalysts are successful in desulphurizing the feedstock, they require large amounts of expensive external hydrogen. Furthermore, the processes are practised late in the overall upgrading process, and thus all equipment upstream of the hydrotreating step must be manufactured from corrosive resistant materials to withstand the sulphur content.

Heavy hydrocarbons derived from such fossil fuels as oil sand bitumen and heavy oil typically contain very high amounts of sulphur. In particular, oil sand bitumen, large deposits of which exist in the Athabasca oil sand deposits of Alberta, Canada, contain about 4.5 to 5.0% by weight sulphur. A portion of this sulphur seems to be quite labile and is therefore slowly released throughout the upgrading processes. The sulphur is dispersed over various product fractions in the upgrading process and thus each of these fractions must be treated in expensive corrosive resistant equipment and ultimately be hydrotreated to remove the sulphur.

Thus any process capable of reducing the sulphur content of these sulphur-containing heavy hydrocarbons would be advantageous. A desulphurization process not requiring external hydrogen would be particularly advantageous.

Asphaltene is a solid component of fossil fuels generally defined as that solubility class which is precipitated from solutions of petroleums and bitumens in an aromatic solvent by the addition of a minimum of 40 volumes of n-pentane. Asphaltenes so derived can be pyrolyzed to recover useful volatile hydrocarbons. Hydrogen sulphide is also produced during the pyrolysis. The hydrogen sulphide can be removed from the pyrolysis product stream by conventional scrubbing techniques. A process which would increase the release of hydrogen sulphide during pyrolysis would be advantageous as the hydrogen sulphide can be easily removed and the amount of sulphur entrained in other forms in the pyrolysis products is reduced.

In U.S. Pat. No. 1,976,806 issued Sept. 18, 1931, to R. Rosen, a process is provided for desulphurizing normally gaseous petroleum products. The gaseous stream is passed over a catalyst comprising ferrous sulphide mixed with promoters consisting of oxides and sulphides of Group III and Group IV metals. The process is performed in the absence of hydrogen, but has only been shown to be effective with normally gaseous petroleum products.

Metal sulphide catalysts have been developed for purposes other than desulphurizing hydrocarbon sources. Exemplary are the catalysts disclosed in U.S. Pat. No. 2,559,325 issued to P. Spillane and U.S. Pat. No. 3,974,096 issued to M. Segura et al. These catalysts however are dissimilar to the catalyst of the present invention and are used in non-analogous processes.

SUMMARY OF THE INVENTION

In accordance with the present invention, a novel catalyst composition is provided which has been found to be effective in removing at least a portion of the sulphur contained in sulphur containing hydrocarbons, without the use of an external source of hydrogen. The catalyst composition is a sulphided mixture, on a catalyst support, of (a) a sulphide of one or more of the transition metals iron, vanadium, molybdenum and copper, (b) a sulphide of either sodium or potassium, and (c) a hydroxide of either sodium or potassium.

The most preferred catalysts are sulphided mixtures of one of iron (II) sulphide or copper (I) sulphide, together with sodium sulphide and sodium hydroxide, supported on alumina.

In another aspect of the invention a process is provided for preparing the catalyst composition. The process includes slurrying together, in an aqueous solution, (a) a sulphide of one or more of iron, vanadium, molybdenum and copper, (b) sodium or potassium sulphide, and (c) sodium or potassium hydroxide. This slurry is impregnated onto a catalyst support and the resulting mixture is then dried at an elevated temperature. To activate the mixture it is sulphided and then heated to remove any excess sulphide.

Preferably, in the first slurrying step, sufficient water is included to at least partially dissolve the compounds (a), (b) and (c). Then, to prevent the catalyst support from being dissolved, water in excess of that amount which will dissolve the support, is removed prior to impregnating the slurry onto the support.

The invention also extends to a process for using the catalyst composition to remove at least a portion of the sulphur contained in sulphur-containing hydrocarbon feedstocks. The hydrocarbon feedstock is contacted with the above-described catalyst composition at a temperature sufficiently elevated to remove at least a portion of the sulphur in the feedstock as hydrogen sulphide, but preferably at a temperature lower than that which will cause significant coking of the feedstock.

The process has been shown to be effective in removing sulphur from oil sand bitumen, heavy crude oil and asphaltenes.

DESCRIPTION OF THE PREFERRED EMBODIMENTS

Figure 1:
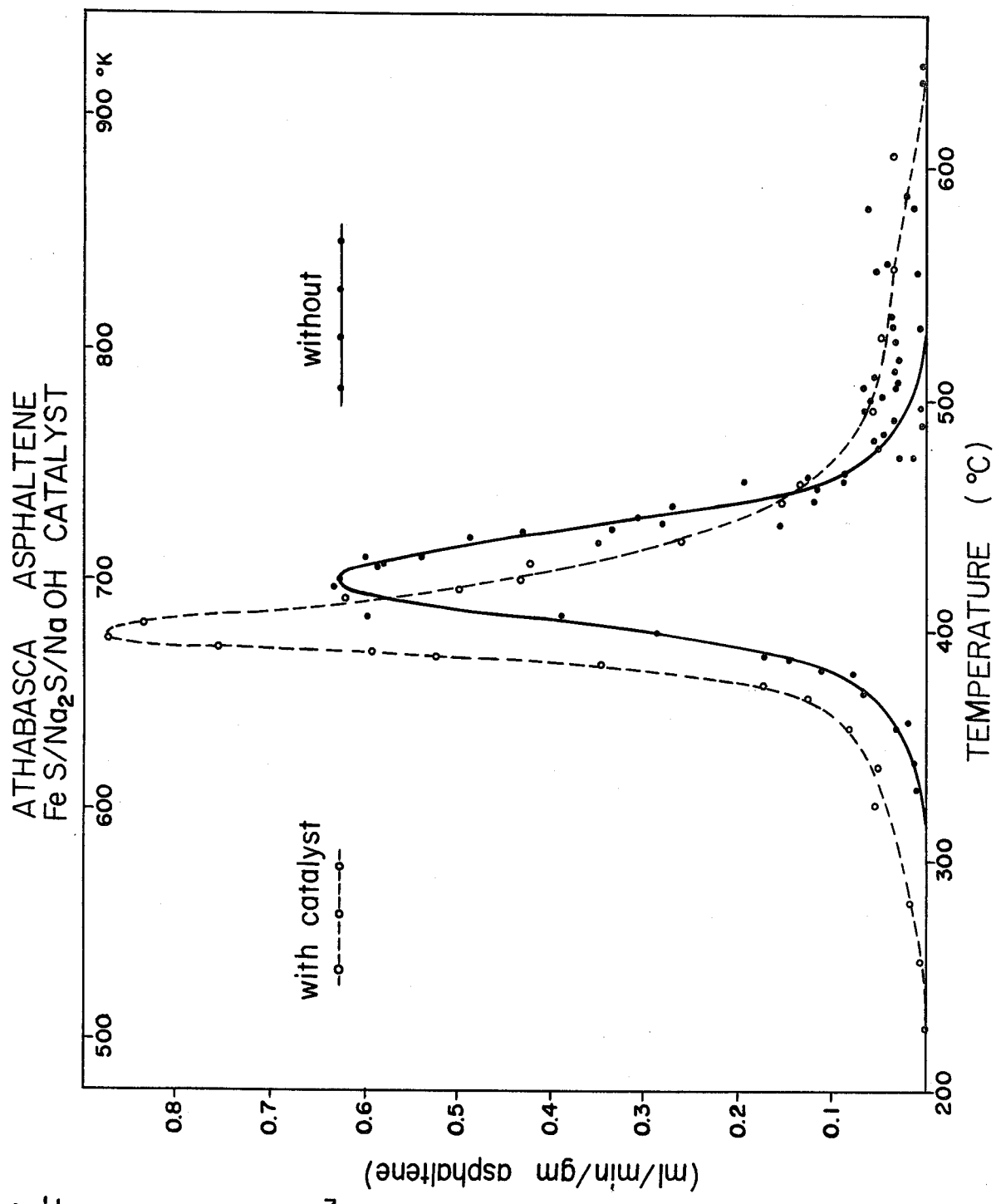
FIGS. 1–4 are plots of the production of $H_2S$, $CO_2$ $H_2$ and $CH_4$ respectively with increasing temperatures during the pyrolysis of Athabasca asphaltenes with the $FeS/Na_2S/NaOH$ catalyst.
Figure 2:
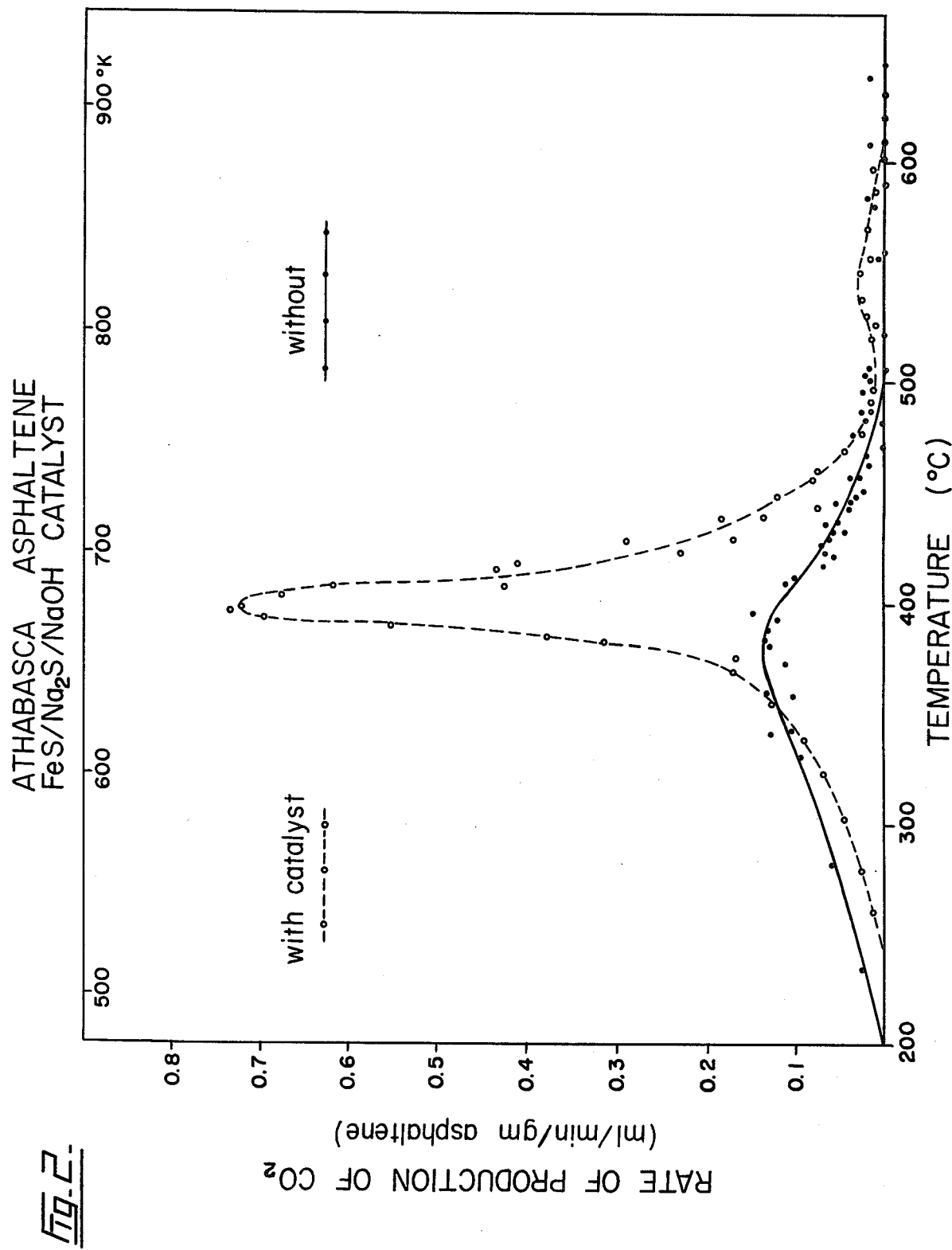
Figure 3:
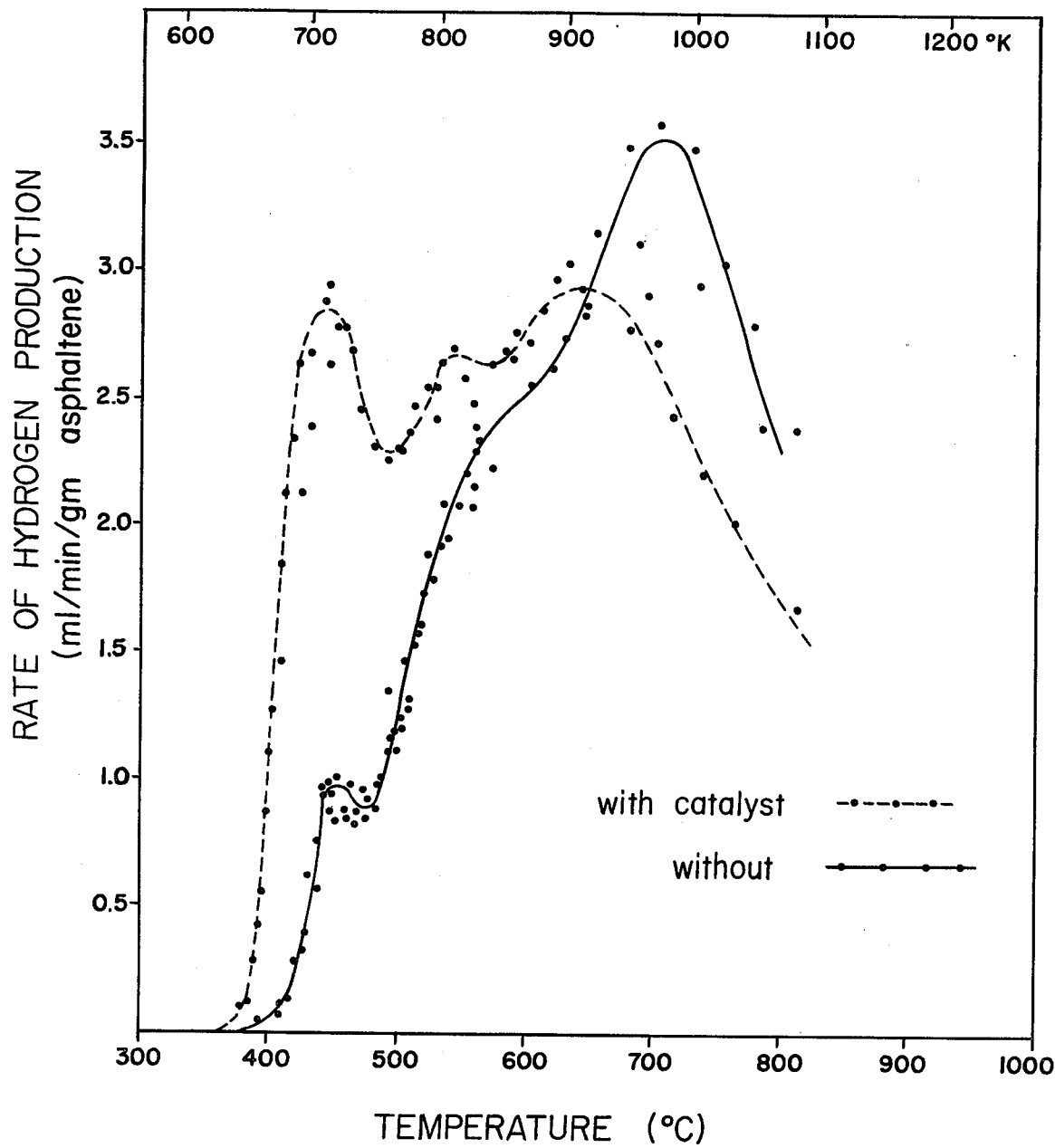
Figure 4:
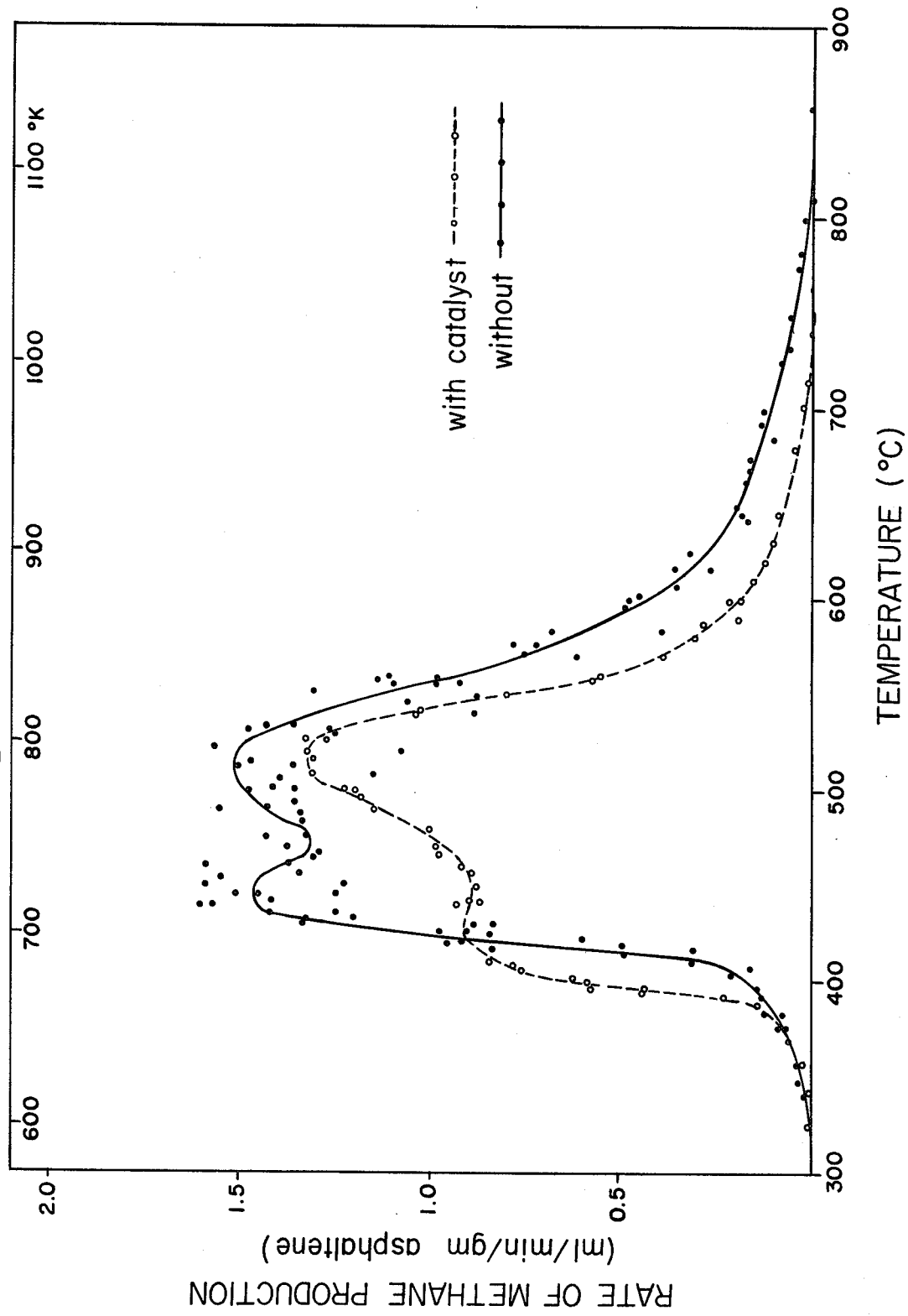
Figure 5:
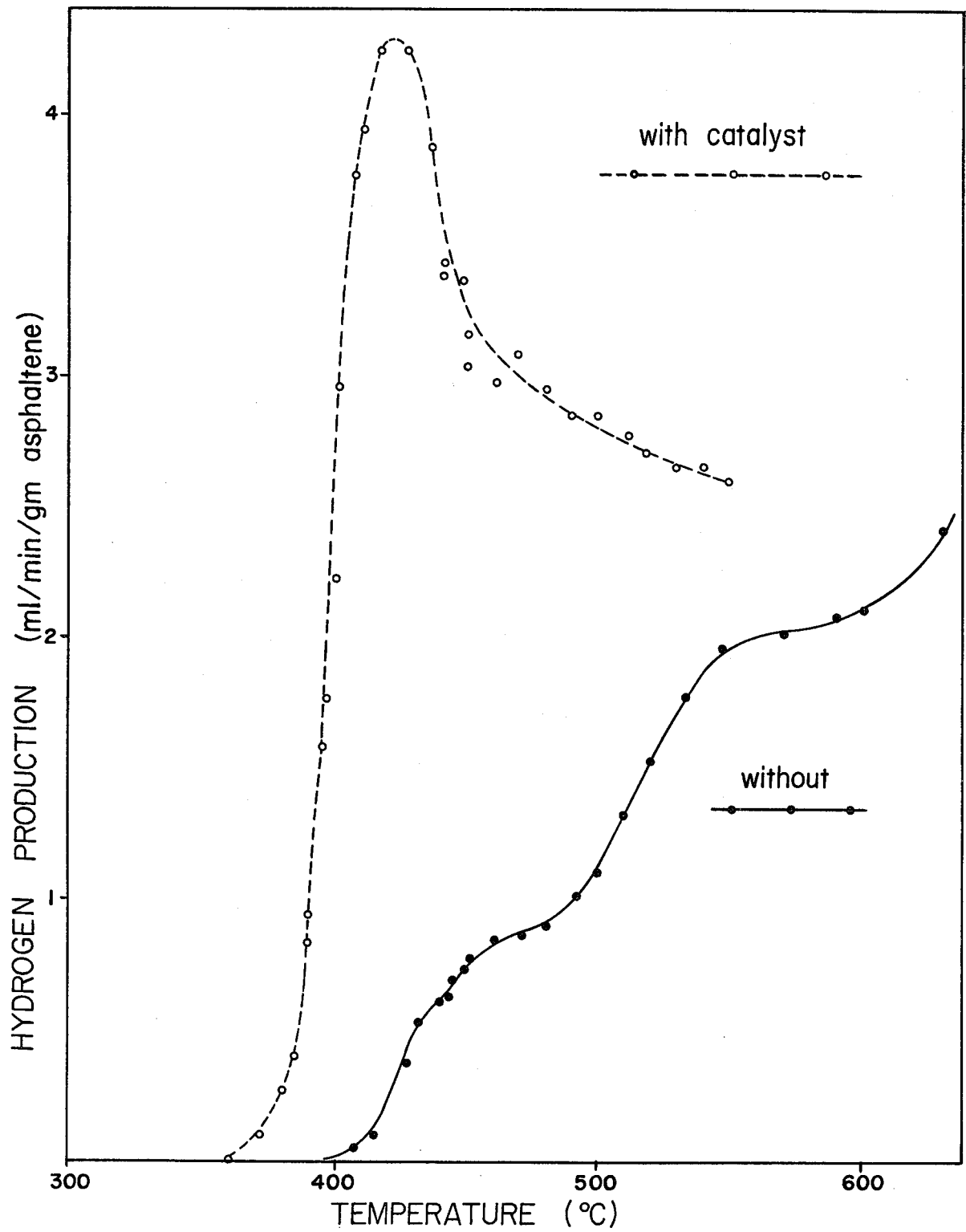
FIGS. 5 and 6 are plots of the production of $H_2$ and $H_2S$ respectively with increasing temperatures during the pyrolysis of Lloydminster asphaltenes with the $Cu_2S/Na_2S/NaOH$ catalyst.
Figure 6:
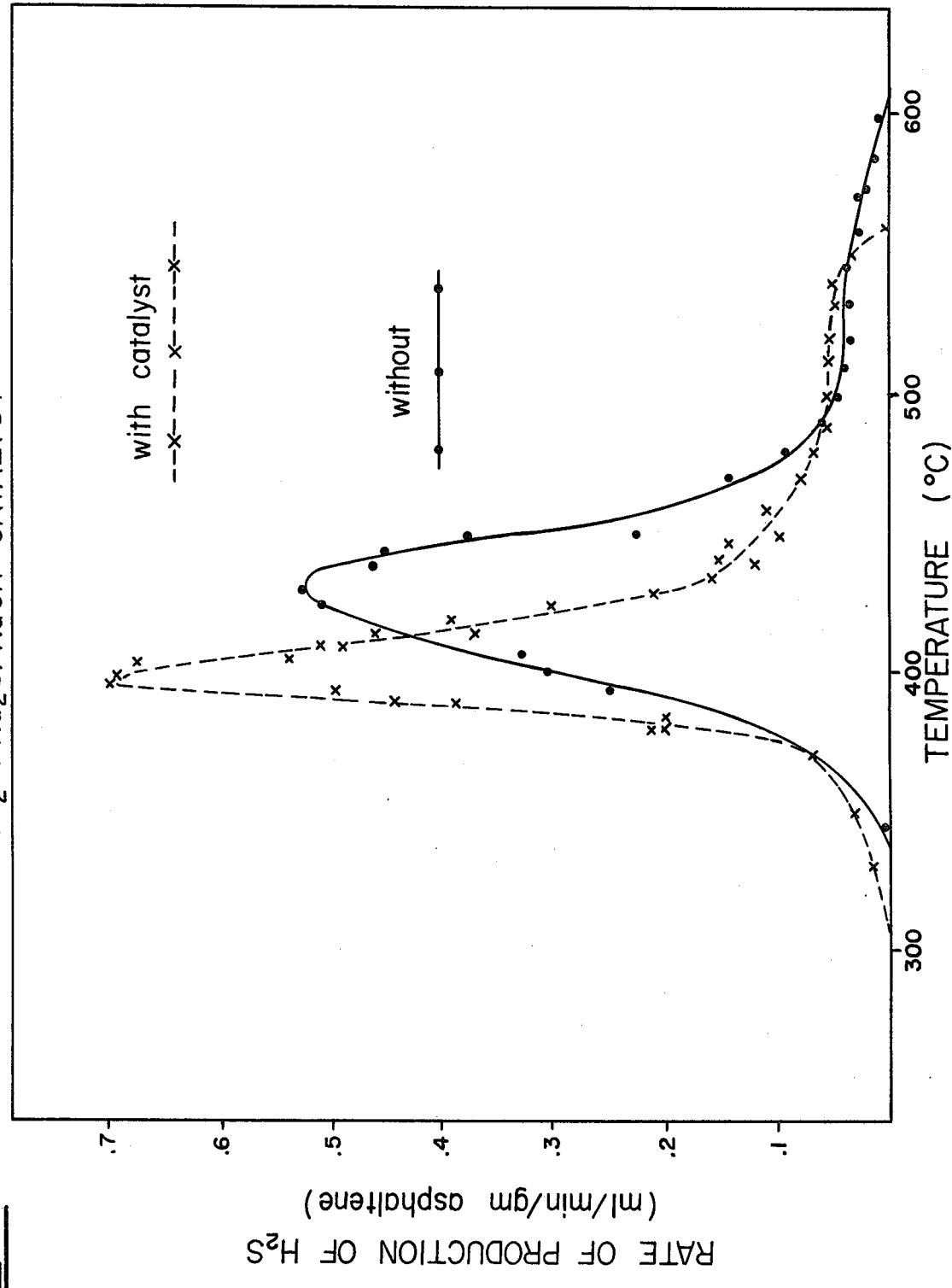

The catalysts of the present invention include a sulphided mixture on a catalyst support of (a) one or more sulphides of iron, copper, vanadium, and molybdenum, (b) sodium or potassium sulphide and (c) sodium or potassium hydroxide.

The most active catalysts of the group, based on activity toward desulphurization of hydrocarbon feedstocks, include a mixture of iron (II) sulphide, sodium sulphide and sodium hydroxide or a mixture of copper (I) sulphide, sodium sulphide and sodium hydroxide. The mixture is supported on a conventional catalyst support, for example alumina, silica gel, kaolin or clay. The more preferred support is alumina. The catalyst is active in a sulphided form.

The catalyst may be used in a variety of forms, for example, powdered, shaped or pelleted. The form used depends to a great extent on the particular feedstock being treated and the reaction conditions under which it is treated.

The catalyst is made by slurrying together, in an aqueous solution, the desired transition metal sulphide, alkali metal sulphide and alkali metal hydroxide. While not being limited by the same, it is believed that the catalyst activity is due in part to the sulphides being at least partially dissolved by the alkalinity caused by the alkali metal hydroxide. Therefore it is preferable to include, in the slurrying step, sufficient water to dissolve the sulphides and the hydroxide. The slurry is then impregnated onto a catalyst support. To prevent the support from being dissolved, the water content of the slurry is preferably reduced by heating, prior to the impregnating step. The resulting mixture is then dried at an elevated temperature, preferably at about 400° C. The catalyst is activated by sulphiding in a known manner. For instance, the catalyst may be sulphided in a stream of $H_2S$ or $CS_2$ at a temperature in the range of about 400°–600° C. for about 4 hours. Excess sulphide is removed by heating, at a temperature in the range of about 600°–800° C., and most preferably in the range of about 700°–750° C., until no further sulphide is detected leaving the catalyst surface.

The ratio of transition metal sulphide, to alkali metal sulphide to alkali metal hydroxide used in the catalyst has not been found to be critical. A 1:1:1 molar ratio has been found to be suitable.

The catalysts have been shown to be effective in removing at least a portion of the sulphur contained in hydrocarbons, including oil sand bitumen, heavy crude oil and asphaltenes, in the absence of an external hydrogen source. The hydrocarbon is contacted with the catalyst at an elevated temperature and sulphur is removed as hydrogen sulphide. The catalysts have been shown to be active toward hydrocarbons in a solid, liquid or gaseous phase. The temperature of the contacting step depends on the particular hydrocarbon feedstock being desulphurized. Generally the contacting temperature is sufficiently elevated to result in the production of hydrogen sulphide.

Sulphur can be removed from oil sand bitumen by contacting the bitumen either directly, or in a solvent which will dissolve bitumen, with the catalyst, at a temperature greater than about 100° C. and less than that which will result in substantial coke formation in the bitumen. Generally, coke formation is significant above about 350° C. Contacting in the presence of a solvent facilitates the handling of the viscous bitumen and aids in controlling the temperature of the process.

After completion of the sulphur removal, the catalyst is removed from the bitumen, for example by filtration. The catalyst is regenerated by washing to remove bitumen, and then heating at a temperature in the range of about 700°–750° C.

Sulphur is removed from heavy crude oil, for example heavy oil from the Lloydminster deposits of Alberta, Canada, in a manner analogous to that used for oil sand bitumen.

The removal of $H_2S$ by pyrolysis of asphaltenes is catalyzed by contacting either the asphaltenes themselves, or the volatile pyrolysis product stream with the catalyst. Pyrolysis generally takes place by heating the asphaltenes through a temperature range of about 300°–900° C. The gases and volatiles produced on pyrolysis include carbon dioxide, hydrogen, methane and hydrogen sulphide. The hydrogen sulphide is removed by any conventional scrubbing technique.

The invention is further illustrated in the following examples:

EXAMPLE 1

Preparation of $FeS/Na_2S/NaOH$ Catalyst

Ferrous sulphide (20 g, 0.228 moles) was mixed with hydrated sodium sulphide, $Na_2S.9H_2O$ (54.6 g, 0.228 moles) and sodium hydroxide (9.1 g, 0.228 moles). The mixture was heated with 150 ml of water with stirring at 100° C. When the total volume was reduced to 100 ml, calcined alumina (80 g, 0178 moles) was stirred in. The heating was continued until the slurry had a clay-like appearance. This mixture was then dried for about 2 hours at 400° C. in a stream of dry nitrogen. The material was then sulphided by passing $CS_2$ vapours over the surface of the dried material for about 4 hours at 500° C. The excess sulphide so deposited was removed by heating the sulphided mixture in a stream of nitrogen at 700° C. for about 6 hours. After this time no further loss of sulphur could be detected.

To prepare the $FeS/Na_2S/NaOH$ catalyst in pellet form the above procedure was followed adding the calcined alumina in pellet form in an amount of 10 g pellets for each 2 g of ferrous sulphide.

Elemental analysis of the catalyst showed the sodium, iron and sulphur content to vary widely from sample to sample. Two catalyst analyses showed the following breakdown:
Sample (1) Fe 7.7, Na 15.8, S 13.7%
Sample (2) Fe 9.7, Na 12.5, S 19.6%
The Fe:S ratio would be expected to vary with the different sulphiding treatment, however no explanation of the variance in the Fe:Na ratio is available.

EXAMPLE 2

Preparation of $Cu_2S/Na_2S/NaOH$ Catalyst

The $Cu_2S/Na_2S/NaOH$ catalyst was prepared by the process set forth in example 1, using 20 g $Cu_2S$ with 31.5 g $Na_2S.9H_2O$ and 5.4 g NaOH to give a 1:1:1 molar ratio. Eighty grams of calcined alumina was used as the catalyst support.

EXAMPLE 3

Desulphurization of Thiophene and Tetrahydrothiophene

This example is included to illustrate the activity of the catalysts toward desulphurization. Two model sulphur-containing compounds, thiophene and tetrahydrothiophene were contacted, in the vapour phase, by a particular catalyst to test that catalyst's activity toward desulphurization.

The catalyst to be tested, as listed in Table 1, was placed in a tube furnace and the furnace was heated to the temperature indicated in the Table. The model compound, thiophene (thioph) or tetrahydrothiophene (tht), was placed in a bubbler and swept through the tube furnace by a stream of nitrogen at a flow rate of about 0.3–0.8 g/hour for 6 hours.

The product stream leaving the tube furnace was passed through a first trap to catch the condensible products and unreacted starting material. The non-condensible products, including the hydrogen sulphide produced in the furnace, were carried through a second trap filled with lead acetate. Hydrogen sulphide in the product stream was converted to lead sulphide in this second trap. The percent conversion to hydrogen sulphide was calculated after gravimetrically determining the quantity of lead sulphide produced. The lead sulphide so produced was often partially colloidal, and it was necessary to heat the suspension of lead sulphide in the lead acetate solution for several hours for coagulation. This also assisted in converting any lead polysulphide present into lead sulphide.

The reactant and product streams were also checked by gas chromatographic analyses to calculate the precision of the results. A precision of ±5% was indicated (e.g. 30±1.5%) in the percent conversion to $H_2S$ data. Further, in some cases, a yellow deposit of elemental sulphur was noted on the catalyst surface after reaction. This would indicate that in some cases the percent conversion to $H_2S$ figure is somewhat lower than the actual percent removal of sulphur from the feedstock.

The results of the test screening are reported in Table 1 below. It will be noted that each of the catalysts including one of vanadium sulphide, molybdenum sulphide, iron (II) sulphide and copper (I) sulphide, with sodium sulphide and sodium hydroxide were all active in desulphurizing the model feedstock. Mixtures of the above transition metal sulphides with sodium sulphide and sodium hydroxide were also active. Generally, alumina was the preferred catalyst support. Further, the control runs showed iron sulphide and sodium sulphide alone to be inactive toward desulphurization. A mixture of iron (II) sulphide and sodium sulphide without the alkali metal hydroxide was also relatively inactive, as was a mixture of molybdenum sulphide and sodium sulphide.

After reaction, the catalysts were regenerated by heating at 750° C. in the tube furnace under a nitrogen stream for several hours. Catalyst activity was maintained, if not slightly increased, in subsequent desulphurization runs.

TABLE 1

DESULPHURIZATION OF THIOPHENE AND TETRAHYDROTHIOPHENE

| Catalyst (1:1:1 molar ratio) | Support | Substrate | Temperature °C. | % Conversion to $H_2S$ |
|---|---|---|---|---|
| FeS | none | tht | 420 | <1 |
| $Na_2S$ | none | tht | 420 | <1 |
| FeS/$Na_2S$ | none | thioph | 420 | 1 |
| | | tht | 420 | 2 |
| FeS/$Na_2S$/NaOH | silica gel | tht | 420 | 10 |
| FeS/$Na_2S$/NaOH | alumina | thioph | 420 | 4 |
| | | tht | 420 | 83 |
| $MoS_2$/$Na_2S$ | silica gel | tht | 400 | 24 |
| $MoS_2$/$Na_2S$/NaOH | silica gel | thioph | 400 | 13 |
| | | tht | 320 | 34 |
| | | | 400 | 77 |
| $V_2S_3$/$Na_2S$/NaOH | silica gel | thioph | 420 | 7 |

TABLE 1-continued

DESULPHURIZATION OF THIOPHENE AND TETRAHYDROTHIOPHENE

| Catalyst (1:1:1 molar ratio) | Support | Substrate | Temperature °C. | % Conversion to $H_2S$ |
|---|---|---|---|---|
| | | tht | 420 | 34 |
| $Cu_2S$/$Na_2S$/NaOH | silica gel | thioph | 420 | 10 |
| | | tht | 350 | 45 |
| | | | 450 | 98 |
| $Cu_2S$/$Na_2S$/NaOH | alumina | thioph | 420 | 1 |
| | | tht | 420 | 9 |
| *$Cu_2S$/$Na_2S$/NaOH | alumina | thioph | 420 | 5 |
| | | tht | 420 | 32 |
| FeS+$V_2S_3$/$Na_2S$/NaOH | silica gel | thioph | 420 | 13 |
| | | tht | 420 | 36 |
| $V_2S_3$+CuS/$Na_2S$/NaOH | silica gel | thioph | 420 | 3 |
| | | tht | 420 | 22 |
| $MoS_2$+$Cu_2S$/$Na_2S$/NaOH | alumina | thioph | 420 | 13 |
| | | tht | 420 | 60 |

*A 1:2:2 molar ratio was used in this one case.

EXAMPLE 4

Sulphur Removal from Oil Sand Bitumen in Solvent

This example is included to demonstrate the activity of the catalysts in removing sulphur from oil sand bitumen by contacting the catalyst with the bitumen in an aromatic solvent. The bitumen used in the example was toluene extracted from Athabasca oil sand bitumen. The catalysts and solvents tested are listed in Table 2.

The bitumen (20 g), catalyst (5 g), and solvent (75 ml) were loaded into a flask fitted with an inlet tube, to carry nitrogen gas, and a reflux condensor. An effluent tube was connected to the top of the condensor and led to two bubbler traps containing lead acetate. The flask contents were refluxed at the boiling point of the particular solvent used for 36 hours. The stream of nitrogen carried any hydrogen sulphide produced through the lead acetate traps to be converted to lead sulphide. The lead sulphide content was determined gravimetrically.

The percent desulphurization achieved with each catalyst is reported in Table 2 below. In spite of the low reaction temperatures used, active catalysts converted up to 20–25% of the sulphur contained in the bitumen to hydrogen sulphide.

A number of blank runs were also performed to show that the support or solvent alone yielded no hydrogen sulphide from the bitumen. Also, commercially available, pre-sulphided cobalt molybdate was tested by the above procedure, and yielded no measurable hydrogen sulphide release after refluxing in mesitylene.

To regenerate the catalysts after use, the mixture of bitumen, solvent and catalyst was filtered. The recovered catalyst was heated at 750° C., under nitrogen for several hours. The regenerated catalysts were found to be active in subsequent desulphurization runs.

TABLE 2

DESULPHURIZATION OF OIL SAND BITUMEN WITH SOLVENT

| Catalyst | Support | Solvent | % Desulphurization |
|---|---|---|---|
| none | alumina | none | 0 |
| none | none | mesitylene | 0 |
| cobalt molybdate | alumina | mesitylene | 0 |
| $Cu_2S$/$Na_2S$/NaOH | silica gel | mesitylene | 3.8 |
| FeS/$Na_2S$/NaOH | alumina | toluene | 2.5 |
| | | mesitylene | 23.5 |
| $V_2S_3$/$Na_2S$/NaOH | silica gel | cumene | 3.5 |

TABLE 2-continued
DESULPHURIZATION OF OIL SAND BITUMEN WITH SOLVENT

| Catalyst | Support | Solvent | % Desulphurization |
|---|---|---|---|
| $MoS_2$ + $FeS/Na_2S/NaOH$ | alumina | mesitylene | 11.6 |
|  |  | cumene | 9.1 |

EXAMPLE 5

Sulphur Removal From Oil Sand Bitumen Without Solvent

This example is included to show the catalyst activity in removing sulphur from oil sand bitumen without a solvent. To demonstrate this activity, a sample of oil sand bitumen (20 g, toluene extracted) was heated to 345° C. with the $FeS/Na_2S/NaOH$ catalyst on an alumina support (as prepared in Example 1) under a stream of nitrogen for 36 hours. The equipment used was in Example 4. The $H_2S$ liberated corresponded to a 38% desulphurization of the bitumen. The catalyst was removed by diluting the bitumen with toluene and filtering the mixture. Toluene was then removed under vacuum. The remaining bitumen was then reheated with fresh catalyst at 220° C. for 36 hours. A further 9% of the original sulphur was removed as $H_2S$. Repetition of this process one further time removed another 9% of the original sulphur as $H_2S$, totalling 56% desulphurization based on $H_2S$ production.

The above-described process resulted in considerable coking, so the process was repeated at a lower temperature. In a single 26 hour run, with 20 g of bitumen and 5 g of the $FeS/Na_2S/NaOH$ catalyst on alumina, at a temperature not exceeding 280° C., a total desulphurization of 53% was achieved.

While not being bound by the same, it is believed that the higher temperature (345° C.) may have caused too rapid a coking reaction, resulting in chemical trapping of some sulphur in heavy residue. The lower temperature (280° C.) is believed to cause more rapid desulphurization and only slow coking.

Another catalyst, the potassium analog of the above catalyst, $FeS/K_2S/KOH$ supported on alumina, and prepared by the procedure set forth in Example 6 below, was also shown to be active to desulphurizing bitumen by the above procedure. Bitumen (20 g) was contacted with the $FeS/K_2S/KOH$ catalyst (5 g) at 320° C. for 28 hours. The reaction yielded a bitumen 65% reduced in sulphur content. A high degree of coking took place, however it is anticipated that, as above, the catalyst should also be very active at the preferred lower temperatures of reaction.

EXAMPLE 6

Substitution For Sodium Moiety In Catalyst

The present example demonstrates the effect of substituting other alkali metals or alkaline earth metals for the sodium sulphide and sodium hydroxide components. The catalysts were synthesized by the procedure used in Example 1, using a 1:1:1 molar ratio of the transition metal sulphide to the alkali metal or alkaline earth metal sulphide to the alkali metal hydroxide. The activity of the catalysts thus formed was tested by refluxing the bitumen in mesitylene at 160° C. for 36 hours as in Example 4. The percent desulphurization results are set forth in Table 3 below.

TABLE 3
SUBSTITUTION OF SODIUM MOIETY IN CATALYST

| Catalyst | Support | % Desulphurization |
|---|---|---|
| $Na_2S/NaOH/FeS$ | alumina | >20 |
| $Li_2S/NaOH/FeS$ | alumina | 2.2 |
| $CaS/NaOH/FeS$ | alumina | 0.7 |
| $MgS/NaOH/FeS$ | alumina | 0.4 |
| $K_2S/NaOH/FeS$ | alumina | 6.6 |
| $K_2S/KOH/FeS$ | alumina | 5.6 |

The above results show the catalysts including either potassium sulphide or potassium hydroxide to have desulphurization activity toward oil sand bitumen. However, catalysts including lithium sulphide, calcium sulphide and magnesium sulphide show very little activity toward the desulphurization reaction.

EXAMPLE 7

Pyrolysis of Asphaltenes

The example is included to show the catalyst activity in the elimination of hydrogen sulphide during the pyrolysis of asphaltenes. The asphaltenes tested were Athabasca asphaltene, derived from the Athabasca oil sand deposits of Alberta, Canada, and Lloydminster asphaltenes, derived from the Lloydminster heavy oil deposits of Alterta, Canada.

Asphaltene samples were derived from benzene extracted oil sand bitumen to produce a 1 g bitumen/1 ml benzene solution. The benzene-bitumen solution was centrifuged to remove fines. The asphaltenes were then precipitated in 40 ml n-pentane per ml of the benzene-bitumen solution. A mixture of the desired catalyst (0.5 g) and asphaltene (2 g) was packed with quartz chips into a furnace heated reaction vessel. Nitrogen gas was swept through the reaction vessel to remove the pyrolysis products. The vessel was initially flushed with nitrogen at room temperature for one hour. The temperature in the reaction vessel was then gradually raised by 3° C./min. Samples of the effluent gas were collected at various temperatures and later analyzed by gas chromatography for hydrogen sulphide, carbon dioxide, hydrogen and methane content.

The production of these gases is plotted against temperature in the accompanying Figures. The catalyzed pyrolysis results are contrasted by pyrolysis results without the catalysts. These results shown an increase in the rate of production of hydrogen sulphide, carbon dioxide and hydrogen when the catalyst is present. Furthermore, the temperature at which hydrogen sulphide and hydrogen are produced is lowered in the presence of the catalysts.

While the present invention has been disclosed in connection with the preferred embodiment thereof, it should be understood that there may be other embodiments which fall within the spirit and scope of the invention as defined in the following claims.

The embodiments of the invention in which an exclusive property or privilege is claimed are defined as follows:

1. A process for producing a catalyst composition, comprising:
    slurrying together, in an aqueous solution, (a) a sulphide of a transition metal selected from the group consisting of iron, vanadium, molydenum, copper and mixtures thereof, (b) a sulphide of an alkali metal selected from the group consisting of sodium and potassium, and (c) a hydroxide of an alkali metal selected from the group consisting of sodium and potassium;

impregnating the slurry onto a catalyst support;

drying the slurry and support at an elevated temperature;

sulphiding the dried mixtures; and heating the sulphided mixture to remove excess sulphide therefrom.

2. The process as set forth in claim 1, wherein:

sufficient water is included in the slurrying step to dissolve at least a portion of the compounds (a), (b), and (c); and any water in excess of the amount which will dissolve the catalyst support is removed prior to impregnating the slurry onto the support.

3. The process as set forth in claim 2, wherein:

the dried slurry-support mixture is sulphided by passing a stream selected from hydrogen sulphide and carbon disulphide over the mixture; and the excess sulphide is removed by heating the sulphided mixture at a temperature in the range of about 700° to 750° C. until no further sulphide is removed.

4. The process as set forth in claim 1, wherein:

the catalyst support is alumina.

5. The process as set forth in claim 4, wherein:

the transition metal sulphide is iron (II) sulphide;

the alkali metal sulphide is sodium sulphide; and the alkali metal hydroxide is sodium hydroxide.

6. The process as set forth in claim 5, wherein:

the transition metal sulphide is copper (I) sulphide;

the alkali metal sulphide is sodium sulphide; and the alkali metal hydroxide is sodium hydroxide.

7. The process as set forth in claim 5 or 6, wherein:

the molar ratio of the transition metal sulphide to the alkali metal sulphide to the alkali metal hydroxide is about 1:1:1.

8. The process as set forth in claim 6, wherein:

the molar ratio of the transition metal sulphide to the alkali metal sulphide to the alkali metal hydroxide is about 1:1:1.

* * * * *